United States Patent [19]

Pederson

[11] Patent Number: 5,967,092
[45] Date of Patent: Oct. 19, 1999

[54] DRAINED AND CUSHIONED FEED LOT FOR LIVESTOCK

[76] Inventor: Les Pederson, 4444 S. York St., Sioux City, Iowa 51106

[21] Appl. No.: 08/979,720

[22] Filed: Nov. 28, 1997

[51] Int. Cl.⁶ .................................................. A01K 1/00
[52] U.S. Cl. ................................... 119/528; 119/525
[58] Field of Search ....................... 119/525, 526, 119/528; 404/34, 35

[56] References Cited

U.S. PATENT DOCUMENTS 2,515,847   7/1950   Winkler ..................................... 428/17
4,945,858   8/1990   Myers et al. ............................. 119/526

FOREIGN PATENT DOCUMENTS 2552089   5/1977   Germany ................................. 119/526
658248    4/1979   U.S.S.R. ................................. 119/528

*Primary Examiner*—Robert P. Swiatek

[57] ABSTRACT

A base for a feed lot composed of baled rubber material such as waste tires. The bales are placed beneath the surface of the feed lot and covered with earth. Any gaps between bales are filled with sand to provide for good drainage of the lot.

9 Claims, 1 Drawing Sheet

DRAINED AND CUSHIONED FEED LOT FOR LIVESTOCK

BACKGROUND AND SUMMARY OF THE INVENTION

This invention pertains to feed lots for livestock, especially cattle, and more particularly to a base for the feed lot which is well drained and cushioned so that the livestock will have a firm but cushioned floor on which to walk and therefore can avoid the strain of traversing lots having deep mud for a surface.

At present much livestock—particularly cattle are fed to market weight in confined outdoor feed lots. The lots provide some space for cattle to walk around in, but the feed for those cattle is placed in feed bunks where the amount, and principally the content of the feed can be controlled. Thus, the ration fed to a group of cattle can be set and followed by providing only that ration in the feed bunk and will not be varied by having the cattle feeding in pastures or the like during the period when the cattle are being finally fed.

Such lots are generally bare of vegetation and are subject to becoming very muddy from excess rain or from snow-melt. Such mud can be churned up by cattle hooves so that the animals can move only with considerable effort, and may become seriously bogged down.

In order to prevent such experience, the present invention provides a floor-like structure less expensive and far more comfortable to the animals than the occasionally-used concrete. That floor-like structure may be composed of waste rubber materials such as baled tires properly placed in the feed lot, and covered with a relatively thin layer of earth and sand to provide proper drainage.

DESCRIPTION

Figure 1:
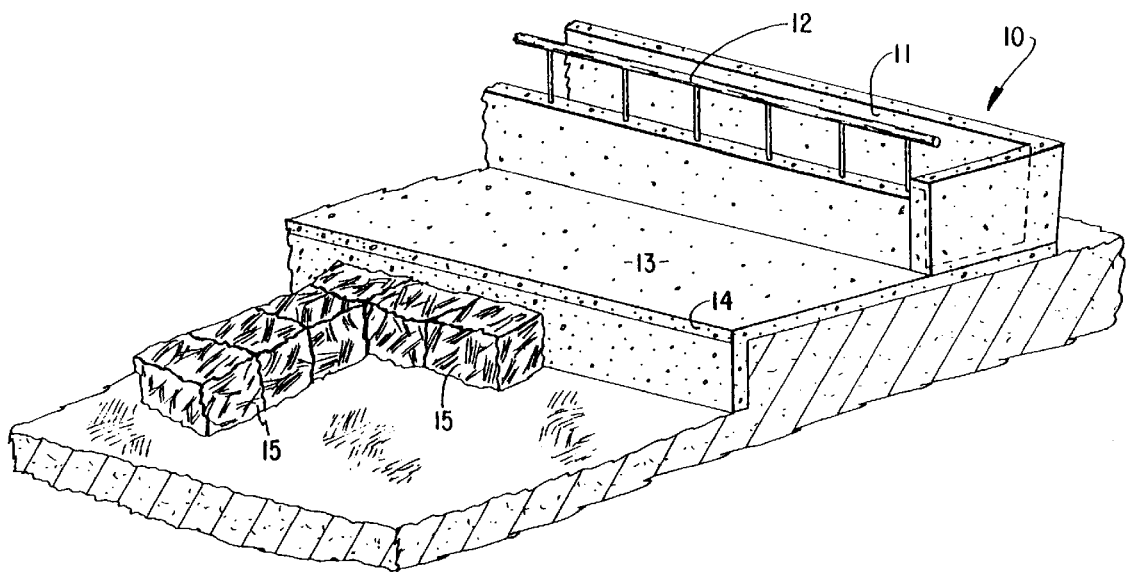
FIG. 1 is a perspective view, partly in section, showing a feed lot with a feed bunker and a floor according to the invention under construction in the feed lot.
Figure 2:
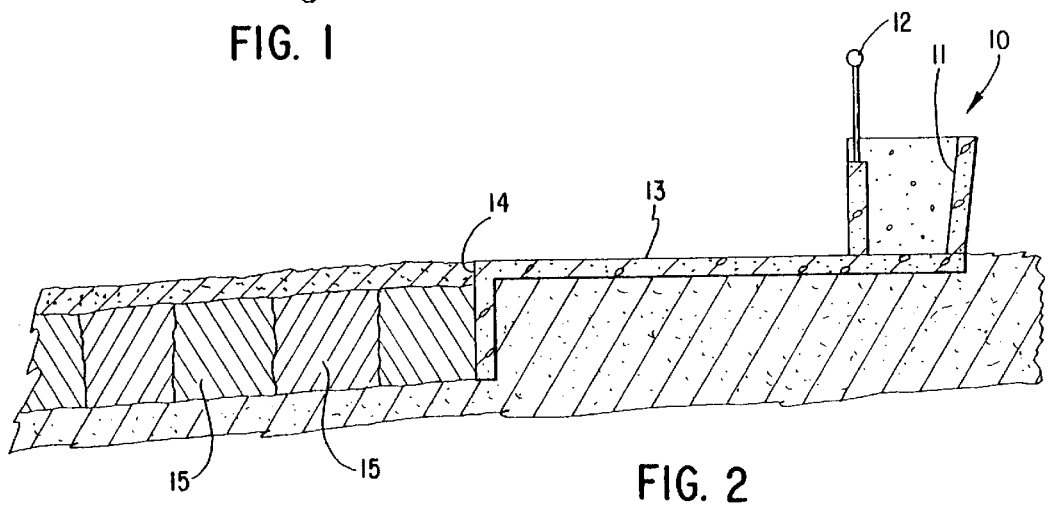
FIG. 2 is a sectional view of the lot showing the finished floor.

Briefly the invention comprises a novel floor for a livestock feed lot composed of somewhat resilient material and constructed to be well drained to avoid deep mud in the feed lot.

More particularly and referring to the drawings, the feed lot is illustrated as having the usual feed bunk 10 having a trough 11 into which the feed may be placed and which is guarded by a rail or fence 12 to avoid having cattle climbing into the trough 11. A concrete apron 13 may extend into the lot away from the trough.

According to the invention, the earth from the outer edge 14 of the concrete apron 13 extending well into the feed lot or entirely covering the lot is removed to a depth sufficient to allow placement of blocks or bales 15 of resilient material such as discarded rubber tires. The depth should equal the thickness of the bales 15 plus some 4 to 8 inches. These bales 15 are placed adjacent each other. Any spaces between the bales are filled with sand, gravel, or similar particulate material to provide drainage channels for the drainage of water from the surface of the floor. These channels are caused by irregularities of the bales and must be relatively narrow so as to avoid unreasonable settling of the sand. Such settling in a wide channel might result in the catching of a hoof and possible injury to an animal. Therefore, the gaps between bales must be kept to a minimum. In practice it has been determined that a gap having a width less than one-third the width of the hoof of a cow or the like is advised. Because cattle have divided hooves, any spacing greater than that would probably lead to entrapment of hooves with possible injuries to the legs of the animals.

After the placement of the bales 15 and the placement of the sand in the spaces is completed, the entire floor is recovered with sand or a slurry of soil and sand to provide a top surface on which the livestock can walk. The floor will be free of deep mud and will be relatively dry and resilient for the benefit of the livestock.

Figure 3:
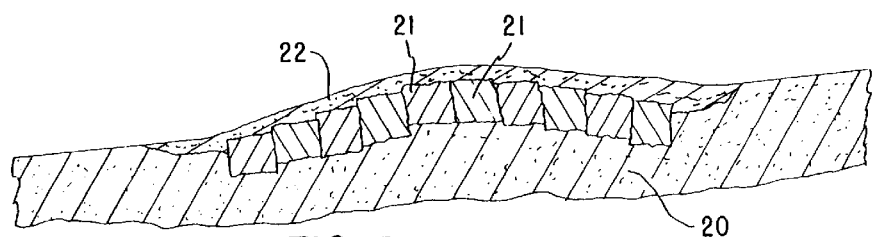
FIG. 3 is a sectional view showing the floor in a somewhat different application in the feed lot.

It will be apparent that the use of such a floor need not be limited to the area adjacent the feed trough although that might be the most desirable place. However, many feed lots are also built with mounds which seem to be favored by some animals. Whether the reason is because the mounds are better drained or for some other reason appears unimportant. But it is clear that the same type of floor construction could be used to provide drainage and a resilient base for the surface of such a mound. FIG. 3 is an illustration of such a mound.

In FIG. 3, the base 20 of the mound is built up of surrounding earth. The bales 21 are then arranged over the base and any spaces between the bales are filled with sand. The entire mound is then covered with a layer 22 of material in the same way as the feeding floor approach. It will be apparent that the space for the bales 21 may be excavated, or the bales may simply be laid down and the cover layer 22 used to provide properly sloped edges of the mound.

Thus, by the use of the resilient material embodied in baled used tires or the like, a resilient and well-drained surface can be provided for a livestock feed lot. It will be apparent that although presently the principal use may be for cattle feed lots, that the same sort of footing may be desirable for such specialty types of animals as bison or elk (wapiti) which may be fed in such lots. It will also be apparent that while swine are now generally raised indoors and walk on slatted floors which provide for waste droppings to fall into collecting pits, still the described base could be used for a swine feed lot should such become desirable for reasons not now apparent.

I claim:

1. A floor for livestock feeding comprising a subfloor of baled resilient material and a cover of readily drainable porous earth material spread over said resilient material.

2. The floor of claim 1 in which said subfloor comprises a series of bales of tire casings formerly used as automotive equipment.

3. The floor of claim 1 in which said subfloor comprises a series of bales of resilient material laid side by side.

4. The floor of claim 3 in which—said bales are laid with narrow gaps there between, said gaps—between said bales—being filled with particulate matter.

5. The floor of claim 4 in which said bales are covered with a mixture of sand and soil whereby a well drained surface is formed over said bales.

6. The floor of claim 4 in which said narrow gaps are of a width less than one-half the width of the hoof of an adult bovine animal.

7. The method of forming a floor for a feed lot having a feed bunk and a concrete apron immediately adjacent said bunk which comprises excavating the earth over a substantial area adjacent the apron, placing bales of resilient material in said excavated area, and covering said bales with porous well-drained material to form said floor.

8. The method of claim 7 in which said excavation is done to a depth equal to the thickness of said bales plus four to eight inches, the thickness of said covering being sufficient to raise the surface of said floor to the height of the surface of said apron.

9. The method of claim 8 in which the bales are laid adjacent other bales, and filling any gaps between said bales, with particulate material before covering said bales.

* * * * *